June 9, 1953
H. CARLETON
2,641,457
RECORDING DECELEROMETER
Filed Dec. 22, 1948
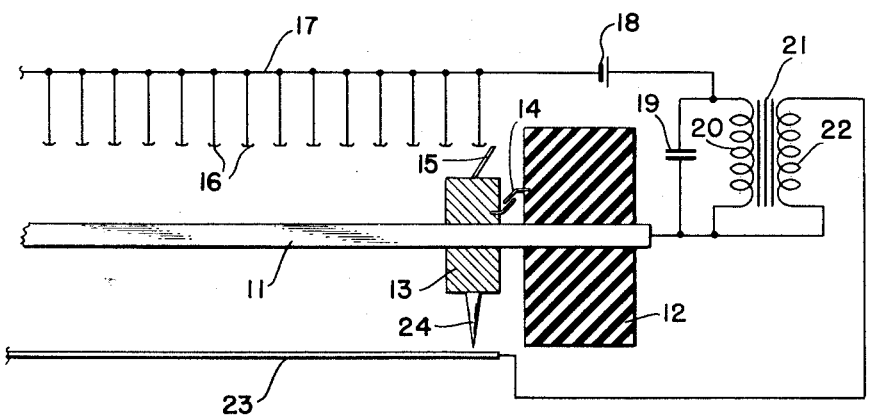
INVENTOR.
HENRY CARLETON
BY *m. a. Hayes*
ATTORNEY Patented June 9, 1953

2,641,457

UNITED STATES PATENT OFFICE 2,641,457

RECORDING DECELEROMETER

Henry Carleton, Silver Spring, Md.

Application December 22, 1948, Serial No. 66,695

15 Claims. (Cl. 264—1)

(Granted under Title 35, U. S. Code (1952), sec. 266)

The present invention concerns a recording decelerometer and particularly concerns a recording decelerometer for use in aircraft to record deceleration of the aircraft that occurs during a crash. In connection with an aircraft crash it is necessary in analyzing the causes of such crash and in designing safety equipment such as shoulder straps, safety belts and crash helmets, for personnel to know the deceleration occurring during the crash. For this purpose it is desirable to have mounted in the aircraft a decelerometer that operates automatically upon the occurrence of a crash to make a continuous and permanent record of the deceleration involved. It is desirable that the record be made in linear form with individual markings made at regular and known time intervals. The acceleration can be computed from the record by measuring the distance between the markings.

Previous devices of this type prove unsatisfactory under actual crash conditions. One previous device measures peak acceleration and is found unsatisfactory because it does not provide a continuous record. Another previous device uses an electrically driven buzzer to provide a time base on the record and this is unsatisfactory because the buzzer easily becomes misadjusted with the result that the time base is not correct. Another previous device makes use of a stylus for tracing a record on a carbon-covered chart and this is unsatisfactory because the stylus easily becomes misadjusted and more particularly because the carbon-covered chart is readily destroyed by fire.

The present invention overcomes these disadvantages by providing a recording decelerometer that forms a continuous record of deceleration upon a metal strip that is fire resistant. The present invention embodies a weight that is freely slidable upon a guide rod and that upon sliding movement closes an oscillatory circuit that is coupled to a second circuit including a metal recording strip disposed parallel to the guide rod. The slidable weight carries a metal point disposed to move along the metal recording strip in spark-gap relation so that oscillation of the coupled circuit causes a spark to jump across the gap and make a pit on the metal recording strip. With this device a continuous record is made on the metal strip and the record is highly resistant to fire such as occurs during aircraft crashes. Operation of the device is automatic and no manual switching is required. A battery for energizing the oscillatory circuit is the only element requiring servicing and replacement. The device embodies a minimum number of parts; no buzzer or other interrupter is required and no stylus is required.

An object of the invention is to provide a recording decelerometer.

Another object is to provide a recording decelerometer for use in aircraft and adapted for automatic operation under crash conditions.

Another object is to provide a recording decelerometer that provides a continuous record under conditions of high deceleration occurring in aircraft crashes.

Another object of the invention is to provide a recording decelerometer that forms a fire-resistant record of deceleration.

Another object is to provide a recording decelerometer in which there is formed a linear record having individual markings at regular and known time intervals.

Another object is to provide a recording decelerometer in which the time base is provided by spark-gap means energized by an oscillatory electric circuit and in which the spark-gap means and oscillatory circuit are controlled by acceleration of a freely sliding weight.

Further objects and advantages of this invention as well as its construction, arrangement and operation will be apparent from the following description and claims in connection with the accompanying drawing, in which the single figure is a diagrammatic view of a preferred embodiment of the invention.

There is shown a guide rod 11 of electrically conductive material fixedly mounted in an insulation block 12 that is fixedly supported in any suitable manner (not shown) in the frame of an aircraft. Preferably guide rod 11 extends from insulation block 12 in a forward direction with respect to the aircraft. Mounted for freely sliding movement upon guide rod 11 is a weight 13 of electrically conductive material. Weight 13 is normally retained in the position shown in the drawing relative to insulation block 12 by means of latch 14 but under crash conditions latch 14 is actuated to release weight 13 for acceleration along guide rod 11 in a direction away from insulation block 12. Acceleration of weight 13 is caused by deceleration of the aircraft.

Mounted on the periphery of weight 13 is a leaf contactor 15 of electrically conductive material. Disposed along the path of movement of leaf contactor 15 is a series of contacts 16. Acceleration of weight 13 along guide rod 11 causes leaf contactor 15 successively to engage contacts 16. Contacts 16 are connected by a common conductor 17 to one terminal of a battery 18. A capacitor 19 and an inductance winding 20 are connected in parallel between the other terminal of battery 18 and guide rod 11.

Inductance winding 20 forms the primary of a step-up transformer 21, the secondary winding 22 of which is connected at one end to guide rod 11 and at the other end to a metal recording strip 23. Metal recording strip 23 is disposed parallel to guide rod 11. Mounted on the periphery of weight 13 opposite to leaf contactor 15 is a hard metal point 24 that is disposed in spark-gap relation relative to metal recording strip 23 regardless of the position of weight 13 along rod 11.

In operation with the device installed in an aircraft, crashing of the aircraft results in actuation of latch 14 to release weight 13 which accelerates along guide rod 11 in a direction away from insulation block 12. Engagement of leaf contactor 15 with an individual contact 16 closes the circuit including conductor 17, battery 18, capacitor 19, inductance winding 20 and guide rod 11. Capacitor 19 and inductance winding 20 form a resonant unit that causes oscillation of the current within the circuit described. The oscillating current is stepped up in transformer 21 so that current oscillates at a high potential in the circuit including recording strip 23 and hard metal point 24. The frequency of the oscillating current is determined by the magnitude of capacitor 19 and the effective inductance of winding 20. The oscillating current causes sparks to jump across the gap between recording strip 23 and hard metal point 24 substantially at the peak voltages of the oscillating current to pit metal strip 23 and form a record thereon. The electrical oscillation and series of pits formed on recording strip 23 as a result of engagement of leaf contactor 15 with any individual contact 16 soon dies out but subsequent engagement of leaf contactor with another contact 16 provides another series of oscillations and another series of pits on recording strip 23.

The time base of the pits on recording strip 23 is known from the frequency of the oscillating circuit, which frequency is determined by the magnitude of capacitor 19 and the effective inductance of winding 20. The distance between any two pits on recording strip 23 can be measured by a linear scale. The acceleration can then be computed by the formula:

$$S = \tfrac{1}{2} a t^2$$

where
$S$ = distance traveled
$a$ = deceleration
$t$ = elapsed time

Obviously many modifications and variations of the present invention are possible in the light of the above teachings. It is therefore to be understood that within the scope of the appended claims the invention can be practiced otherwise than as specifically described.

The invention described herein may be manufactured and used by or for the Government of the United States of America for governmental purposes without the payment of any royalties thereon or therefor.

I claim:

1. A device for measuring acceleration comprising means adapted to move with acceleration along a path, an oscillatory circuit, sliding contact means associated with the first means for energizing said circuit simultaneously with the onset of acceleration of the first means, and means coupled to said oscillatory circuit and adapted to record oscillations in the circuit.

2. A device for measuring acceleration comprising means adapted for acceleration along a path, an oscillatory circuit, sliding electrical contact means associated with the first means for energizing said circuit simultaneously with the onset of acceleration of the first means, a second circuit coupled to the first circuit and including means adapted to record oscillations through the second circuit, and means in the second circuit and associated with the first means to energize said recording means at each of said oscillations.

3. A device for measuring acceleration comprising means adapted to move with acceleration along a path, an oscillatory circuit including multiple contact means, means associated with the first means for sequentially closing said contact means to energize said oscillatory circuit simultaneously with the onset of acceleration of the first means, a second circuit coupled to the first circuit including spark-gap means adapted to record oscillations through the second circuit, and means forming part of said spark-gap means and associated with said first means to energize said spark-gap means at each of said oscillations.

4. A device for measuring acceleration comprising an element adapted to move with acceleration along a path, an electrical circuit comprising contact means and a resonant circuit, a member carried by said element and adapted to close said electrical circuit through said contact means, a second electrical circuit coupled to the first circuit and including means adapted to record oscillations through the second circuit, and an electrically conductive member in the second circuit and carried by said element and adapted to energize said recording means at each of said oscillations.

5. A device for measuring acceleration comprising an element adapted to move with acceleration along a path, an electrical circuit comprising a series of contact means and a resonant circuit, a member carried by said element and adapted to close said circuit successively through said contact means, a second circuit coupled to the first circuit and including a metal surface, and an electrical conductor in the second circuit and carried by said element and having a portion thereof at spark-gap distance from said surface and adapted to be marked by sparks passing across said gap, said surface being positioned so that as said element moves said portion and said surface continue to be at spark-gap distance from each other.

6. A device for measuring crash acceleration in an aircraft, said device comprising a straight conductive guide rod adapted to extend parallel to the longitudinal axis of the aircraft, a conductive weight slidably mounted on said guide rod, a plurality of electric contacts connected electrically in parallel relation and extending along one side of said rod in spaced relation therefrom, a conductive leaf mounted on said weight and adapted to contact successive contacts upon sliding of said weight on said guide rod, circuit means including a source and a tuned resonant network connecting said electric contacts to said guide rod, whereby an oscillatory voltage is set up and maintained in said circuit in accordance with contacting of said contacts by said leaf, recording means including a second circuit inductively coupled to said network and means defining a spark gap, said spark-gap defining means comprising a conductive strip extending parallel to said rod in spaced relation therefrom, and a pointed member carried by said weight and spaced from said conductive strip, the second circuit being responsive to occurrence of resonance in said network to actuate said spark gap to effectuate recordation, whereby sliding of said weight automatically initiates an oscillatory voltage in said circuit automatically to actuate said spark gap and effectuate recordation.

7. Timing mechanism adapted to be carried in a movable craft, comprising substantially unrestrained sliding means responsive to deceleration of the craft, an oscillatory circuit, means associated in part with said first means to energize said oscillatory circuit for generating a signal, and means coupled to said oscillatory circuit and associated in part with said first means actuatable by said signal to provide a continuous time scale.

8. Timing mechanism carried in a movable craft, comprising substantially unrestrained sliding means responsive to deceleration of the craft in excess of a predetermined deceleration value, an oscillatory circuit, means associated in part with said first means to energize said oscillatory circuit for generating a variable electric signal having a fixed frequency value, and means coupled to said oscillatory circuit and associated in part with said first means actuatable by said signal to provide a continuous time scale.

9. Decelerometer apparatus carried in a craft movable at relatively high speeds and subject to extremely high deceleration, comprising substantially unrestrained sliding means responsive to deceleration of the craft in excess of a predetermined deceleration value, an oscillatory circuit, means associated in part with said first means to energize said oscillatory circuit for generating a varying signal having a fixed frequency value independent of the magnitude of said deceleration, and means coupled to said oscillatory circuit and associated in part with said first means actuatable by said varying signal to indicate the magnitude of said deceleration.

10. A decelerometer for use in a mobile craft, comprising a substantially unrestrained movable body adapted normally to move with the craft and in response to deceleration of the craft in excess of a predetermined deceleration value to acquire an acceleration relative the craft, an oscillatory circuit means carried in part on said body to energize said oscillatory circuit for generating a varying voltage signal, and means coupled to said oscillatory circuit and carried in part on said body responsive to said signal to provide a continuous measure of the deceleration.

11. The decelerometer as in claim 10, wherein said generating means comprises a movable contact member and a plurality of relatively fixed contact members.

12. The decelerometer as in claim 10, wherein said signal-responsive means comprises a spark-gap recorder.

13. A device for measuring acceleration comprising an element adapted to move with acceleration along a path, an electrical circuit comprising multiple contact means and a resonant circuit, a member carried by said element and adapted to close said electrical circuit through intermittent contact with said contact means, thereby to generate electrical oscillations of frequency corresponding to that of said resonant circuit, a second electrical circuit coupled to the first circuit and including means adapted to record oscillations through said second circuit, and an electrically conductive member in the second circuit and carried by said element and adapted to energize said recording means at each of said oscillations.

14. An accelerometer for use in connection with a moving object to determine acceleration of such object, said accelerometer comprising a body, self-releasing means for connecting said body to such object and for releasing said body from such object in response to an acceleration of such object in excess of a predetermined acceleration, said body being substantially freely movable except for the constraint of said self-releasing means whereby said body can have motion relative to such object, means activated by such relative motion of said body for generating a signal, and means actuated by said signal to provide a time scale.

15. An accelerometer for use in connection with a moving object to determine acceleration of such object, said accelerometer comprising a single body, self-releasing means for connecting said body to such object and for releasing said body from such object in response to an acceleration of such object in excess of a predetermined acceleration, said body being substantially freely movable except for the constraint of said self-releasing means whereby said body can have motion relative to such object, means activated by such relative motion of said body for generating a signal, and means actuated by said signal to provide a time scale, whereby a time scale is provided by the motion of said single body for all changes in acceleration once said predetermined acceleration has been exceeded.

HENRY CARLETON.

References Cited in the file of this patent

UNITED STATES PATENTS

| Number | Name | Date |
|---|---|---|
| 1,125,731 | Savage | Jan. 19, 1915 |
| 2,011,645 | Miller | Aug. 20, 1935 |
| 2,024,230 | Klopsteg | Dec. 17, 1935 |
| 2,411,401 | Welch | Nov. 19, 1946 |
| 2,440,605 | Hathaway | Apr. 27, 1948 |
| 2,461,322 | Hathaway | Feb. 8, 1949 |
| 2,521,918 | Hudson | Sept. 12, 1950 |
| 2,552,722 | King | May 15, 1951 |